(12) United States Patent
Matsumura

(10) Patent No.: US 9,174,491 B2
(45) Date of Patent: Nov. 3, 2015

(54) PNEUMATIC TIRE

(75) Inventor: Hiroyuki Matsumura, Kodaira (JP)

(73) Assignee: BRIDGESTONE CORPORATION, Tokyo (JP)

(*) Notice: Subject to any disclaimer, the term of this patent is extended or adjusted under 35 U.S.C. 154(b) by 306 days.

(21) Appl. No.: 13/202,046

(22) PCT Filed: Feb. 18, 2010

(86) PCT No.: PCT/JP2010/001046
§ 371 (c)(1),
(2), (4) Date: Oct. 31, 2011

(87) PCT Pub. No.: WO2010/095439
PCT Pub. Date: Aug. 26, 2010

(65) Prior Publication Data
US 2012/0042999 A1   Feb. 23, 2012

(30) Foreign Application Priority Data
Feb. 18, 2009   (JP) ................... 2009-035431

(51) Int. Cl.
B60C 11/00 (2006.01)

(52) U.S. Cl.
CPC ....... B60C 11/005 (2013.01); *B60C 2011/0025* (2013.04); *B60C 2011/0033* (2013.04); *B60C 2200/065* (2013.04); *Y10T 152/10495* (2015.01)

(58) Field of Classification Search
CPC .............. B60C 11/005; B60C 11/0041; B60C 11/0008; B60C 11/00; B60C 2011/0033; B60C 2011/0016; B60C 2011/0025; B60C 9/18; B60C 2200/06; B60C 2200/065; B60C 2200/08; B60C 2200/14; Y10T 152/01495
USPC ......... 152/209.5, 209.6, 209.7, 209.1, 209.12
IPC ....................................................... B60C 11/00
See application file for complete search history.

(56) References Cited

U.S. PATENT DOCUMENTS 3,853,164 A     12/1974  Mirtain
3,931,844 A  *   1/1976  Mirtain ................ 152/209.5
(Continued)

FOREIGN PATENT DOCUMENTS

CN      1521022 A    8/2004
CN    101085591 A   12/2007
(Continued)

OTHER PUBLICATIONS

English language machine translation of JP09-104077, 1997.*
(Continued)

*Primary Examiner* — Richard Crispino
*Assistant Examiner* — Philip N Schwartz
(74) *Attorney, Agent, or Firm* — Sughrue Mion, PLLC

(57) ABSTRACT

It is found that the amount of wear of a tread rubber of a tire, which is abandoned as wear life of the tread rubber expires, is not uniform over the entire width, and there is a high correlation between distribution in the tread width direction of the remaining thickness of the tread rubber of the abandoned tire and distribution in the tread width direction of wear effective rubber volume. On the basis of this finding, it is possible to improve wear life of a pneumatic tire 1, by making volume distribution of a base rubber layer 8 of a tread rubber 4, which has a layered structure, equal to distribution of the wear effective rubber layer, so that the tread rubber 4 wears equally in the tread width direction.

5 Claims, 3 Drawing Sheets

(56) References Cited

U.S. PATENT DOCUMENTS

| | | | |
|---|---|---|---|
| 4,289,183 A * | 9/1981 | Abe et al. | 152/209.24 |
| 4,735,247 A | 4/1988 | Makino et al. | |
| 5,503,205 A * | 4/1996 | Aoki et al. | 152/209.14 |
| 6,340,041 B1 * | 1/2002 | Sugihara et al. | 152/209.5 |
| 6,705,367 B1 * | 3/2004 | Kobayashi | 152/209.22 |
| 2004/0211501 A1 * | 10/2004 | Kajita | 152/209.15 |

FOREIGN PATENT DOCUMENTS

| | | | | |
|---|---|---|---|---|
| EP | 0 904 958 A2 | 3/1999 | | |
| JP | 49-67305 A | 6/1974 | | |
| JP | 61-135803 A | 6/1986 | | |
| JP | 3-125605 A | 5/1991 | | |
| JP | 4-50004 A | 2/1992 | | |
| JP | 09-104077 A | 4/1997 | | |
| JP | 09104077 A * | 4/1997 | | B29D 30/52 |
| JP | 11-48263 A | 2/1999 | | |
| JP | H11170813 A | 6/1999 | | |
| JP | H11245619 A | 9/1999 | | |
| JP | 2001150911 A | 6/2001 | | |
| JP | 2003-127613 A | 5/2003 | | |
| JP | 2003-326917 A | 11/2003 | | |
| JP | 2003326917 A * | 11/2003 | | B60C 11/04 |
| JP | 2004-224270 A | 8/2004 | | |
| JP | 2007-31523 A | 2/2007 | | |
| JP | 2007-203961 A | 8/2007 | | |
| JP | 2007-210552 A | 8/2007 | | |
| WO | 2008/143104 A1 | 11/2008 | | |

OTHER PUBLICATIONS

International Search Report of PCT/JP2010/001046 dated Mar. 23, 2010.
Chinese Office Action, dated May 9, 2013, issued in corresponding Chinese Patent Application No. 201080017124.0.
Extended European Search Report, dated May 7, 2013, issued in corresponding European Patent Application No. 10743568.7.
Japanese Notification, dated Jun. 18, 2013, issued in corresponding Japanese Patent Application No. 2011-500515.
Japanese Office Action, dated Oct. 22, 2013, issued in corresponding Japanese Patent Application No. 2011-500515.
Chinese Office Action, dated Nov. 25, 2013, issued in corresponding Chinese Patent Application No. 201080017124.0.
Chinese Office Action, dated Apr. 22, 2014, issued in corresponding Chinese Patent Application No. 201080017124.0.
Japanese Office Action dated Mar. 4, 2014, issued in corresponding Japanese Patent Application No. 2011-500515.
Chinese Office Action dated Oct. 31, 2014, issued in corresponding Chinese Patent Application No. 201080017124.0.

* cited by examiner

PNEUMATIC TIRE

CROSS REFERENCE TO RELATED APPLICATIONS

This application is a National Stage of International Application No. PCT/JP2010/001046 filed Feb. 18, 2010, claiming priority based on Japanese Patent Application No. 2009-035431 filed Feb. 18, 2009, the contents of all of which are incorporated herein by reference in their entirety.

TECHNICAL FIELD

The present invention relates to a pneumatic tire having a tread rubber formed with a layered structure including a cap rubber layer located on the outer side in the tire radial direction and a base rubber layer located on the inner side in the tire radial direction, and a groove on a road contact surface of a tread, and in particular, to a tire for heavy loads for a construction vehicle used under severe conditions. In particular, the present invention proposes a technique for enhancing wear resistance by suppressing partial wear of the tread rubber, thereby largely improving wear life of the tread rubber as well as the tire.

RELATED ART

In a tire for a construction vehicle, there has been widely used a tread rubber formed with a layered structure including a cap rubber layer located on the outer side in the tire radial direction and a base rubber layer located on the inner side in the tire radial direction.

This is because it is possible to reduce the wear of the tread rubber on the road contact surface of a tread to secure the wear resistance of the tread rubber, by forming the cap rubber layer located on the road contact surface side of the tread with a rubber composition having excellent wear resistance, and, it is possible to prevent damage or breakdown of the tread rubber caused by thermal degradation of the rubber and detachment of adhesion surfaces between the tread rubber and the belt due to rise in temperatures within the tread rubber, by forming the base rubber layer located on the outer circumferential side of the belt with a rubber composition exhibiting small heat generation.

As a conventional tire having the tread rubber with the two-layered structure on the inner and outer sides, for example, Patent Document 1 proposes a radial tire for heavy loads having improved durability at a high speed, in which hardness of rubbers of and hardness difference between the base rubber layer and the cap rubber layer are defined, and the rubber thickness of the base rubber increases toward the outer side in the tire width direction, thereby obtaining high wear resistance while suppressing the rise in temperatures especially at a tread shoulder portion, so that detachment of the adhesion surface between the tread rubber and the belt layer can be prevented.

Patent Document 2 proposes a pneumatic tire having a tread rubber with a two-layered structure including a cap rubber layer located at a tread surface portion and a base rubber layer located at a portion that contacts with a belt cording rubber, in which a circumferential shallow groove extending along the tire circumferential direction is provided at a tread center portion; a sheet member whose end portions are exposed at sides thereof is provided on the inner side of the base rubber layer; and, a negative ratio is set to be 8% or less in an area of 25% of the tread width with the tread center being as the center but the area excluding the circumferential shallow groove.

According to the tire described above, it is possible to efficiently reduce the temperatures on the belt layer, by forming the circumferential shallow groove to increase an area for releasing the heat and enhance the heat release function at the tread center portion, while releasing heat occurring on the belt layer from the portion of the sheet member exposed at the sides and having excellent heat conductive property, and it is possible to improve the wear resistance in the vicinity of the center portion where road contacting pressure is high, by reducing the negative ratio in the vicinity of the tread center.

RELATED ART DOCUMENT

Patent Document

Patent Document 1: Japanese Patent Application Laid-open No. 2003-127613
Patent Document 2: Japanese Patent Application Laid-open No. 2007-210552

DISCLOSURE OF THE INVENTION

Problems to be Solved by the Invention

However, although effective in preventing the temperature rise in the tread rubber, the tires described in both of the Patent Documents 1 and 2 exhibit almost the same wear resistance of the tread rubber as a tire simply employing a cap rubber layer having a rubber composition excellent in wear resistance. Therefore, without improving the material properties of the tread rubber, it is substantially impossible to solve the problem of improving the wear resistance of the tire for the construction vehicle.

In view of the facts described above, the present invention provides a pneumatic tire for heavy loads having a tread rubber with a layered structure, which has significantly prolonged wear life of the tread rubber, by effectively enhancing the wear resistance of the tread rubber, without newly developing a composition of a cap rubber more excellent in wear resistance.

Means for Solving the Problem

For a tire with a size of 53/80R63, which was abandoned as a wear life of a tread rubber thereof expired, examination was performed in terms of a remaining thickness of the tread rubber of the tire, and, as a result, it was found that: in most cases, the wear of the tread rubber is not uniform over the entire width; in general, as illustrated in a graph in FIG. 1, the wear due to use of the tire advances partially on the tread rubber; and then, a belt of the tire is exposed partially, so that the tire is abandoned.

Referring now to the graph in FIG. 1, the vertical axis represents a thickness (mm) of the remaining tread rubber of the abandoned tire, and as exemplarily illustrated in a sectional view in the tread width direction of FIG. 2, the horizontal axis represents a parameter of positions on one side of the tread from the tread center, with a half width of the tread being as the reference. In FIG. 1 and FIG. 2, measurement was performed at a tread center position, and positions away from the tread center by 25%, 50% and 75% of the half width of the tread.

In order to find the cause of occurrence of partial wear of the tread rubber in a degree that the belt is exposed as illustrated in FIG. 1, tires having the same tread pattern and the same size were examined as to a relationship between distribution of a wear effective rubber volume in the tread width direction, which is a tread rubber volume that can withstand the wear, and wear resistance of the tread rubber, and then, the effect illustrated in a graph in FIG. 3 can be obtained.

In the graph in FIG. 3, the vertical axis represents a wear resistance property (km/mm) and the horizontal axis represents a wear effective rubber volume (cm$^3$).

It should be noted that, in FIG. 3, the half width of the tread is divided into four positions at the tread center position, and positions away from the center in the tread width direction by 25%, 50% and 75% of the tread width, as in FIG. 1 and FIG. 2, and the wear effective rubber volume is calculated with the width of ±12.5% from the respective positions being as unit of width. However, in the calculation of the wear effective rubber volume, the number of division in the tread width direction is not limited to this number.

From FIG. 3 illustrating the wear resistance at the respective positions on one side from the tread center, it is obvious that the wear resistance becomes more excellent as the wear effective rubber volume becomes larger. By comparing between FIG. 3 and FIG. 1, the present inventor found that there is a high correlation between the distribution of remaining thickness of the tread rubber in the abandoned tire in the tread width direction and the distribution of the wear effective rubber volume in the tread width direction, in other words, in the abandoned tire, the wear effective rubber volume is large at the portion of the tread rubber where the remaining thickness is thick, and the wear effective rubber volume is small at the portion of the tread rubber where the remaining thickness is thin.

The present inventor reached the idea that it is possible to improve the wear resistance of the tread rubber, by defining the thicknesses of the cap rubber layer and the base rubber layer in a manner that the cap rubber layer exhibiting the excellent wear resistance is made thick in the area having the small wear effective rubber volume where the tread rubber thickness largely reduces due to wear, so that the tread rubber wears uniformly in the tread width direction, and as a result, made the present invention.

It should be noted that the term "wear effective rubber volume" refers to a volume of the tread rubber per unit width in the tread width direction from a surface of a tread land portion to a groove bottom in a pneumatic tire having grooves on a road contact surface of the tread rubber. The wear effective rubber volume V can be expressed by $V=(1-e) \times W \times D \times L$, where: w is unit width of the tread rubber in the tread width direction; e is a negative ratio in the unit width when viewed from the road contact surface of the tread; D is a groove depth; and L is a circumferential length.

Further, the term "negative ratio in the unit width" refers to a ratio of groove area with respect to the entire surface area on the circumference of the tire within the unit tread width.

In view of the findings as described above, the invention according to claim 1 of the present application provides a pneumatic tire for heavy loads having: a toroidal carcass extending from a pair of bead cores through side portions to a tread portion; a belt located on the outer side of the carcass in the tire radial direction; a tread rubber located on the outer side of the belt in the tire radial direction; and, a groove on a road contact surface of the tread rubber, wherein: the tread rubber is formed by a base rubber layer located on the inner side of the tread rubber in the radial direction and a cap rubber layer located on the outer circumferential surface of the base rubber layer; the base rubber layer is formed with a rubber composition generating smaller heat as compared with the cap rubber layer; the cap rubber layer is formed with a rubber composition having excellent wear resistance as compared with the base rubber layer; distribution of volume of the base rubber layer in the tread width direction is formed so as to be equal to distribution of wear effective rubber volume of the tread rubber in the tread width direction.

The term "to be equal to distribution of volume" as used in this specification means that, in the tread width direction, distribution ratio of volume of the base rubber layer from the tread center to a tread edge is formed so as to be equal to distribution ratio of the wear effective rubber volume, and does not necessarily require that the volumes thereof are formed so as to be equal with each other. Further, the term "equal" as used in this specification includes, as a tolerable range, a case where a ratio of volume distribution of the base rubber layer in the tread width direction is within ±10% of the distribution ratio of the wear effective rubber volume. It is more preferable that the range is within ±5% of the distribution ratio of the wear effective rubber volume.

It should be noted that, in order to achieve both suppression of heat generation and improvement of wear resistance, the volume distribution of the base rubber layer accords with the distribution of the wear effective rubber volume at least from the tread center to a position away from the tread center by 75% of half width of the tread. In other words, since the wear amount of the tread rubber is small at a portion on the tread edge side of the road contact surface of the tread from the tread edge to a position away from the tread center by 75% of half width of the tread, this portion is not necessarily required to have the volume distribution of the base rubber layer same as the distribution of the wear effective rubber volume, and it may be possible to employ a configuration, for example, in which the volume distribution of the base rubber layer smoothly extends from the 75% position on the road contact surface of the tread to the side portion.

According to the invention of claim 2, a ratio of rebound resilience of the cap rubber layer with respect to rebound resilience of the base rubber layer is in the range of 0.5 to 0.83.

In this specification, the term "rebound resilience" represents a value measured through a test according to JIS (Japanese Industrial Standard) K6255.

According to the invention of claim 3, the rebound resilience of the cap rubber layer is in the range of 0.40 to 0.65, and the rebound resilience of the base rubber layer is more than or equal to 0.75.

According to the invention of claim 4, when a tread half width of the tread rubber is divided into four or more areas in the tread width direction, volume distribution of the base rubber layer is equal to distribution of wear effective rubber volume in each of the four or more areas.

Effect of the Invention

According to the invention of claim 1, it is possible to largely improve wear life of the tire, by increasing the thickness of the cap rubber layer at a portion of the tread rubber of the road contact surface of the tread where the wear effective rubber volume is small to effectively prevent the belt from being exposed as a result of advance of wear at said portion along with use of the tire, thereby making the tire wear uniformly in the tread width direction.

According to the invention of claim 2, it is possible to effectively suppress rise in temperatures within the tread rubber while further enhancing the effect obtained by the invention of claim 1, which is to improve the wear life of the tire, by defining the ratio of rebound resilience of the cap rubber layer with respect to that of the base rubber layer.

More specifically, in the case where the ratio of rebound resilience of the cap rubber layer with respect to that of the base rubber layer exceeds 0.83, there is a possibility that the amount of heat generated in the tread rubber increases, or sufficient effect of enhancing the wear resistance of the tread rubber cannot be expected. Further, the reason for setting the ratio of rebound resilience to be 0.5 or more is that, it is difficult to set the rebound resilience of the base rubber layer to be in excess of two times the rebound resilience of the cap rubber layer while satisfying various properties of the rubber composition for use as the tread rubber.

According to the invention of claim 3, it is possible to effectively suppress the rise in temperatures of the tread rubber, and effectively enhancing the wear resistance. More specifically, in the case where the rebound resilience of the cap rubber layer is less than 0.40, the wear property significantly deteriorates. On the other hand, in the case where the rebound resilience of the cap rubber layer exceeds 0.65, the rebound resilience is undesirably large, and hence, the heat generation cannot be sufficiently suppressed. Further, the rebound resilience of the base rubber layer is less than 0.75, the rebound resilience is undesirably small, and hence, the wear resistance cannot be sufficiently improved.

According to the invention of claim 4, it is possible to effectively enhance the effect obtained by the invention of claim 1, which is to improve the wear life of the tire, by dividing the tread half width of the tread rubber into four or more areas in the tread width direction and calculating the distribution of the wear effective rubber volume, so that the volume distribution of the base rubber layer in the tread width direction can be more precisely set to be equal to the wear effective rubber volume distribution.

BEST MODE FOR CARRYING OUT THE INVENTION

Figure 1:
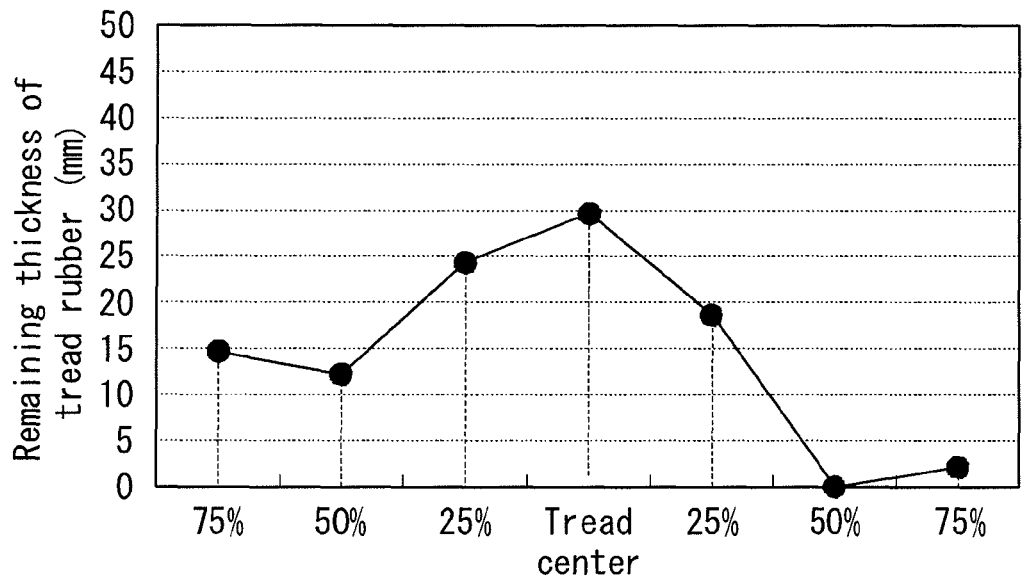
FIG. 1 is a graph showing a distribution of remaining thickness of a tread rubber in the tread width direction of an abandoned tire.
Figure 2:
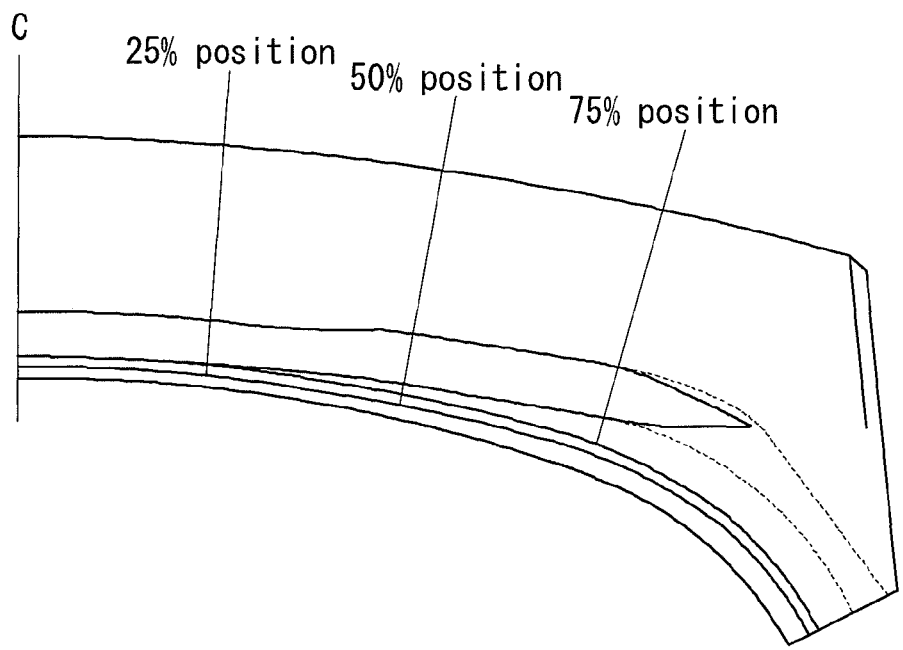
FIG. 2 is a sectional view of a right half of a tread portion in the width direction thereof, which illustrates measurement positions in the tread width direction.
Figure 3:
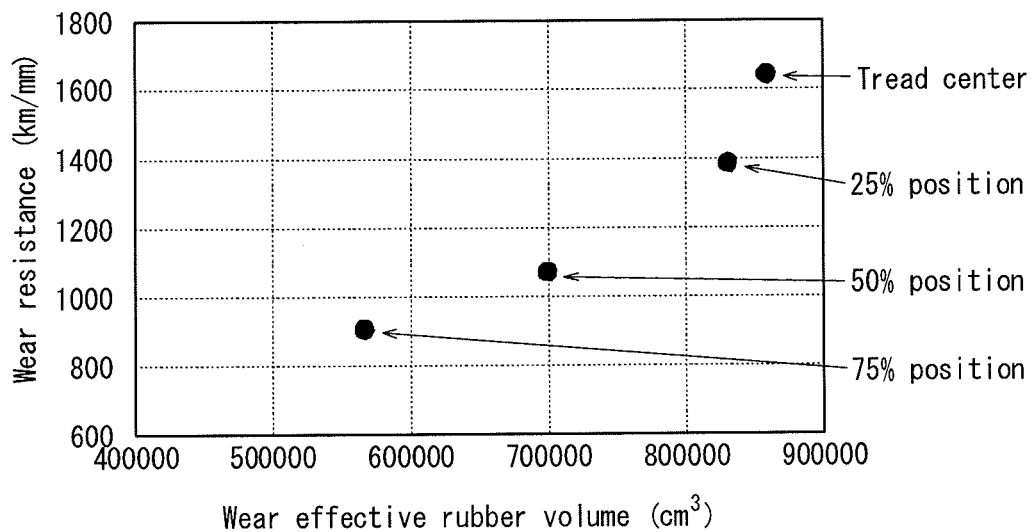
FIG. 3 is a graph showing a relationship between wear effective rubber volume and wear resistance.
Figure 4:
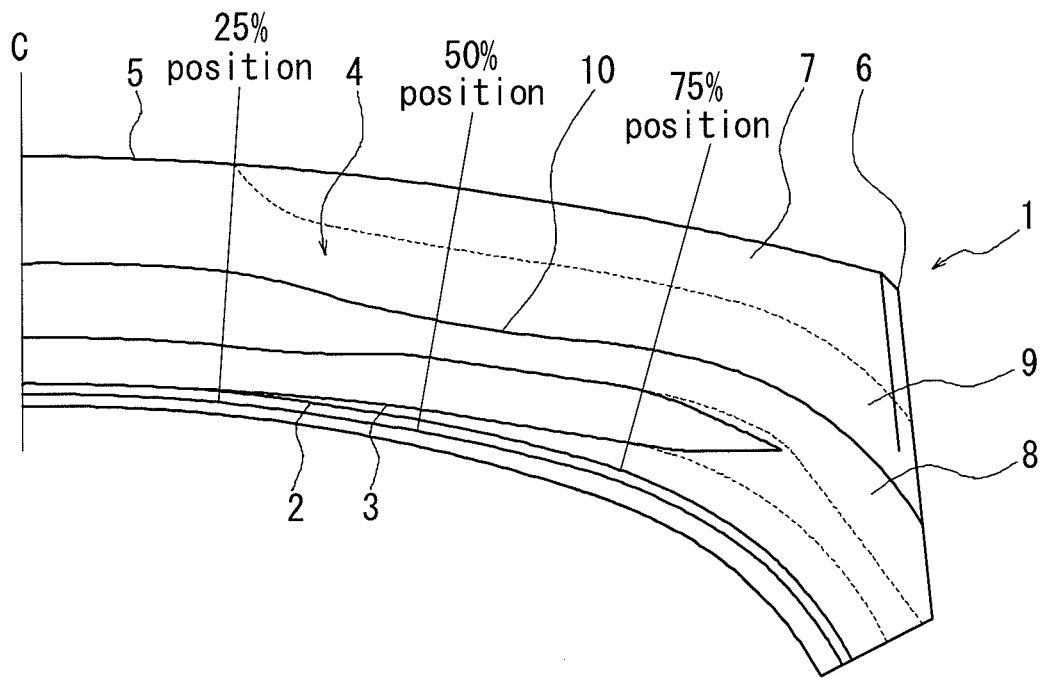
FIG. 4 is a sectional view of a right half of a tread portion in the width direction thereof according to an embodiment of the present invention.

Hereinbelow, with reference to the drawings, an embodiment of the present invention will be described. FIG. 4 illustrates a sectional area of a right half of a tread portion in the tread width direction of a pneumatic tire 1 according to the present invention.

As illustrated in FIG. 4, the pneumatic tire 1 according to the present invention has: a toroidal carcass 2 formed, for example, with a radial structure having one or more carcass plies extending from a pair of bead cores through respective side portions to a tread portion; a belt 3 formed with plural belt layers and located on the outer side of a crown portion of the carcass 2 in the tire radial direction; and, a tread rubber 4 located on the further outer side of the belt 3 in the tire radial direction.

The belt 3 serving as a reinforcing member may be configured, for example, such that: a low angle belt layer for supporting tension in the tread circumferential direction and suppressing a radial growth of the tread is disposed on the innermost side in the plural belt layers in the tire radial direction; a high angle belt layer for maintaining rigidity against extension deformation and compression deformation in the belt width direction is disposed on the outer side of the low angle belt layer in the tire radial direction; and, a protection belt layer functioning as protection for the belt layers described above against break or damage due to input of protrusions from the road surface is disposed on the outer side of the high angle belt layer in the tire radial direction.

More specifically, it may be possible, for example, to: form the low angle belt layer with a cord made of steel and the like and extending obliquely with respect to the tire circumferential direction; form the high angle belt layer with a cord extending in a direction largely oblique to the tire circumferential direction as compared with the belt cord of the low angle belt layer; and, form the protection belt layer with a stretchable cord capable of extending substantially in the tire circumferential direction.

As exemplarily illustrated in FIG. 4, a so-called lug groove 7 may be provided to a road contact surface 5 of the tread rubber 4 so as to extend from a tread edge 6 toward a tread center C and end before reaching the tread center.

Here, the tread rubber 4 has a layered structure including a base rubber layer 8 located on the inner side in the tire radial direction and a cap rubber layer 9 located on the outer circumferential surface of the tread rubber 4. The base rubber layer 8 is formed with a rubber composition generating smaller heat than a rubber composition of the cap rubber layer 9 generates. The cap rubber layer 9 is formed with the rubber composition having excellent wear resistance as compared with the rubber composition of the base rubber layer 8. For example, the cap rubber layer 9 may have rebound resilience in the range of 40 to 65%, whereas the base rubber layer 8 may have rebound resilience of 75% or more.

With this configuration, it is possible to improve wear resistance at the tread road contact surface 5, and to suppress rise in temperatures in the tread rubber 4, thereby preventing damage or breakdown of the tread rubber 4 caused by thermal degradation of the rubber due to the rise in temperatures thereof.

A rubber boundary line 10 in the tread rubber 4 is a line for defining the volume distribution of the base rubber layer 8 and the volume distribution of the cap rubber layer 9. In the present invention, the manner in which the rubber boundary line 10 extends is specified on the basis of calculation of the distribution of the wear effective rubber volume in the tread width direction of the tread rubber 4 so as to make the volume distribution of the base rubber layer 8 equal to the distribution of the wear effective rubber volume.

Next, the method by which the wear effective rubber volume of the tread rubber is calculated in this embodiment will be described in detail.

However, the method of calculating the wear effective rubber volume is not limited to the method described below.

In FIG. 4, in the tread width direction, the tread rubber 4 is first divided equally into four areas at a position away from the tread center C by 25% of the tread half width, a position away from the tread center C by 50%, and a position away from the tread center C by 75%. However, division of the tread rubber 4 is not limited to this, and it may be possible to divide the tread rubber 4 in the tread width direction in an unequal manner, and/or into five or more areas.

It should be noted that, in the case where the distribution of the wear effective rubber volume is made correspond to the volume distribution of the base rubber layer 8 in a more accurate manner, it is preferable to divide the tread rubber 4 into over four areas.

Next, the respective dividing positions, at which the tread rubber 4 is divided in the tread width direction, are set as centers; a space with a certain width is provided at both sides of each of the centers set as described above; and, a width from one end to the other end of the space is set as unit width. Then, a ratio of an area of the lug groove 7 formed in the tread road contact surface 5 with respect to the entire surface area of the tread road contact surface extending within the unit width, in other words, a negative ratio within the unit width when viewed from the tread road contact surface 5 is calculated for each unit width corresponding to each of the dividing positions.

In this embodiment, by preparing a width of ±12.5% of the tread width from each dividing position of four divided areas, a negative ratio within the unit width, which is 25% of the tread width in total, is calculated.

The wear effective rubber volume V can be calculated by the expression:

$$V = (1-e) \times W \times D \times L,$$

where W is a unit width at each dividing position in the tread width direction; e is a negative ratio in the unit width when viewed from the tread road contact surface; D is an average depth of a groove per the unit width; and, L is a tire circumferential length. Calculation is made using the expression for each dividing position.

In the case where: the wear effective rubber volume is calculated as described above; the volume distribution of the wear effective rubber volume is matched with the volume distribution of the base rubber layer 8; and, the lug groove 7 is provided to the surface of the tread rubber 4 in a manner that the groove depth thereof gradually becomes shallow from the tread edge 6 toward the tread center C as described in this embodiment, the volume of the base rubber layer 8, more directly, the thickness of the base rubber layer 8 is formed so as to be thick in the area around the tread center C where the depth of the lug groove 7 is shallow and the negative ratio is small although not clear in the diagram illustrated in FIG. 4, on the basis of the fact that the wear effective rubber volume is large. On the other hand, the thickness of the base rubber layer 8 is formed so as to be relatively thin and the cap rubber layer 9 is formed so as to be relatively thick in the area from the tread center C toward the tread edge 6 on the basis of the fact that the depth of the lug groove 7 is deep, the negative ratio is large, and the wear effective rubber volume is small.

EXAMPLE

Test Example

Next, pneumatic tires according to the present invention were experimentally prepared, and performances thereof were evaluated. Explanation thereof will be described below.

All the prepared tires of Example tires and Conventional Example tire have a size of 53/80R63.

Figure 5:
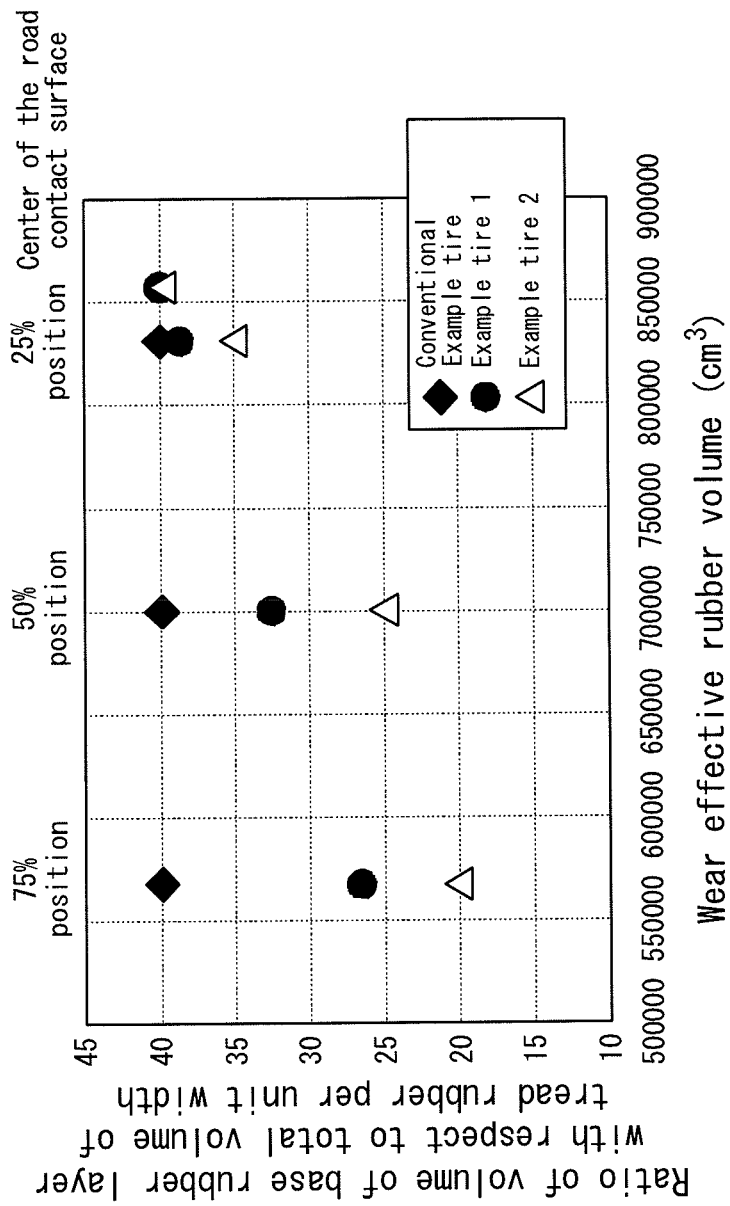
FIG. 5 is a graph showing a relationship between a ratio of volume of a base rubber layer with respect to the entire volume of the tread rubber per unit width, and the wear effective rubber volume.

FIG. 5 is a graph in which a vertical axis represents, by percentage (%), a ratio of volume of the base rubber layer with respect to the entire volume of the tread rubber on the unit width basis, and a horizontal axis represents the wear effective rubber volume (cm$^3$). This graph shows difference in volume distribution of the base rubber layers of the tires under the condition that Conventional Example tire, and Example tires 1 and 2 each have a tread rubber with the same total volume.

More specifically, Conventional Example tire has the base rubber layer with a constant volume at any positions in the tread width direction; Example tire 1 has the base rubber layer with the volume distribution same as the distribution of the wear effective rubber volume; and, Example tire 2 has the base rubber layer having the volume distribution ratio within −10% of the distribution ratio of the wear effective rubber volume, which is within the tolerable range described above, the volume distribution of the base rubber layer being selected such that the volume of the base rubber layer further reduces toward the outer side thereof in the tread width direction as compared with Example 1.

All the sample tires have substantially the same tire configuration except for the ratio of the base rubber layer and the cap rubber layer. Note that, as shown in Table 1, a ratio of the rebound resilient of the cap rubber layer with respect to that of the base rubber layer is set to 0.65 for all the sample tires.

[Evaluation Method]

For all the sample tires described above, a heat generation test and a wear test were performed. Table 1 shows the results of the tests.

TABLE 1

| | Wear test | | Heat generation test on drum | Ratio of |
|---|---|---|---|---|
| | Belt exposure position | Wear life (index) | Temperature on belt (° C.) | rebound resilience |
| Conventional Example tire | 50% position | 100 | — | 0.65 |
| Example tire 1 | Center position | 112 | +2.1 | 0.65 |
| Example tire 2 | Center position | 130 | +5.1 | 0.65 |

The wear test was performed under the conditions of pneumatic pressure being 700 kPa and applied load being 85 ton. The sample tires were made travel on an irregular ground until the belts thereof were exposed from the tread road contact surface, and belt exposed positions in the tread width direction were examined. Then, the travel distances on the irregular surface until the belts are exposed were measure, and the wear resistances thereof were evaluated on the basis of the travel distances by using indices with Conventional Example tire being set as control. For the wear resistance, the larger value represents excellent wear life.

The heat generation test was performed by using a drum heat generation tester with a diameter of 5 m under the conditions of pneumatic pressure of 600 kPa, load of 83.5 ton, speed of 8 km, which are specified by TRA, and travel time of 24 hours. After this heat generation test, the maximum temperatures on the belt of the sample tires were measure. The heat generation resistances of the sample tires were evaluated by calculating the temperature difference between Example tires and Conventional Example tire with Conventional Example tire being set as a reference.

As can be clearly understood from the results of Table 1, Example tires 1 and 2 can effectively prevent the belt from being exposed at a position of 50% where, in Conventional Example tire, the belt exposure is likely to occur due to wear of the tread rubber, and as a result, can largely improve the wear life.

Further, Example tire 1 having the volume distribution of the base rubber layer same as the distribution of the wear effective rubber volume can effectively suppress the temperature rise on the belt, as compared with Example tire 2 having the thicker cap rubber layer than that of Example tire 1.

EXPLANATION OF REFERENCE NUMERALS

1 Pneumatic tire
2 Carcass
3 Belt
4 Tread rubber
5 Tread road contact surface
6 Tread edge
7 Lug groove
8 Base rubber layer
9 Cap rubber layer
10 Rubber boundary line

The invention claimed is:

1. A pneumatic tire for heavy loads having: a toroidal carcass extending from a pair of bead cores through side portions to a tread portion; a belt located on the outer side of the carcass in the tire radial direction; a tread rubber located on the outer side of the belt in the tire radial direction; and, a groove on a road contact surface of the tread rubber, wherein the tread rubber is formed by a base rubber layer located on the inner side of the tread rubber in the radial direction and a cap rubber layer located on the outer circumferential surface of the base rubber layer;

the base rubber layer is formed with a rubber composition generating smaller heat as compared with the cap rubber layer;

the cap rubber layer is formed with a rubber composition having excellent wear resistance as compared with the base rubber layer;

distribution of volume of the base rubber layer in the tread width direction is formed so as to be equal to distribution of wear effective rubber volume of the tread rubber in the tread width direction, the wear effective rubber volume being expressed by the following expression;

wear effective rubber volume=(1−negative ratio per unit width in the tread width direction)×unit width of the tread rubber in the tread width direction×groove depth× circumferential length;

when a tread half width of the tread rubber is divided into four or more areas in the tread width direction, the wear effective rubber volume at the dividing positions decreases toward the outer side in the tread width direction, and the volume distribution of the base rubber layer is equal to the distribution of the wear effective rubber volume when viewed at the dividing positions, and the wear effective rubber volume has a maximum volume in a tread center position, and the wear effective rubber volume decreases continuously from the tread center position to the tread edge.

2. The pneumatic tire for heavy loads according to claim 1, wherein
a ratio of rebound resilience of the cap rubber layer with respect to rebound resilience of the base rubber layer is in the range of 0.5 to 0.83.

3. The pneumatic tire for heavy loads according to claim 1, wherein
the rebound resilience of the cap rubber layer is in the range of 0.40 to 0.65, and the rebound resilience of the base rubber layer is more than or equal to 0.75.

4. The pneumatic tire for heavy loads according to claim 1, wherein
the volume distribution of the base rubber layer smoothly extends from a position away from the tread center by 75% of half width of the tread to the side portion.

5. The pneumatic tire for heavy loads according to claim 1, wherein
the belt comprises a low angle belt layer disposed on the innermost side in the tire radial direction, a high angle belt layer disposed on the outer side of the low angle belt layer in the tire radial direction, and a protection belt layer disposed on the outer side of the high angle belt layer in the tire radial direction.

* * * * *